United States Patent
Shiau et al.

(10) Patent No.: US 12,276,824 B2
(45) Date of Patent: Apr. 15, 2025

(54) LIGHT GUIDE ELEMENT AND BACKLIGHT MODULE

(71) Applicant: Coretronic Corporation, Hsin-Chu (TW)

(72) Inventors: Tzeng-Ke Shiau, Hsin-Chu (TW); Ying-Shun Syu, Hsin-Chu (TW); Wei-Chun Yang, Hsin-Chu (TW); Yi-Cheng Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/661,702

(22) Filed: May 12, 2024

(65) Prior Publication Data

US 2024/0385361 A1 Nov. 21, 2024

(30) Foreign Application Priority Data

May 15, 2023 (CN) .......................... 202310541466.1

(51) Int. Cl.
*F21V 8/00* (2006.01)

(52) U.S. Cl.
CPC .................................. *G02B 6/0016* (2013.01)

(58) Field of Classification Search
CPC .. G02B 6/0016; G02B 6/0036; G02B 6/0038; G02B 6/0058; G02B 6/0015; G02B 6/0011; G02B 6/0033; G02B 6/0035; G02B 6/0018; G02F 1/133615; F21V 2200/00; F21V 2200/20
See application file for complete search history.

(56) References Cited

U.S. PATENT DOCUMENTS

| | | | |
|---|---|---|---|
| 6,752,505 B2 | 6/2004 | Parker et al. | |
| 9,429,700 B2 * | 8/2016 | Chiu | G02B 6/0053 |
| 2001/0053075 A1 | 12/2001 | Parker et al. | |
| 2007/0236957 A1 | 10/2007 | Koganezawa et al. | |
| 2012/0274874 A1 | 11/2012 | Lin et al. | |
| 2016/0033712 A1 | 2/2016 | Sahlhoff et al. | |
| 2017/0242181 A1 | 8/2017 | Montgomery et al. | |

FOREIGN PATENT DOCUMENTS

CN 104932140 9/2015

OTHER PUBLICATIONS

"Search Report of European Counterpart Application", issued on Oct. 28, 2024, p. 1-p. 13.

* cited by examiner

*Primary Examiner* — Bao Q Truong
(74) *Attorney, Agent, or Firm* — JCIPRNET

(57) ABSTRACT

A light guide element includes first and second surfaces, a light-incident surface, and microstructure groups arranged on the first surface. Each microstructure group includes a first microstructure and a second microstructure separated from and being mirror image structures of each other. A first intersection line is provided between a first light-receiving surface of the first microstructure and the first surface. A first distance is provided between the first intersection line and a light-incident intersection line in a first direction. A second intersection line is provided between a second light-receiving surface of the second microstructure and the first surface. A second distance is provided between the second intersection line and the light-incident intersection line in the first direction. A variation trend of the first distance in a second direction is opposite to a variation trend of the second distance in the second direction.

14 Claims, 17 Drawing Sheets

LIGHT GUIDE ELEMENT AND BACKLIGHT MODULE

CROSS-REFERENCE TO RELATED APPLICATION

This application claims the priority benefit of China application serial no. 202310541466.1 filed on May 15, 2023. The entirety of the above-mentioned patent application is hereby incorporated by reference herein and made a part of this specification.

BACKGROUND

Technical Field

The disclosure relates to an optical element and an optical module, and in particular, relates to a light guide element and a backlight module.

Description of Related Art

Generally, the microstructures of a light guide plate are mostly circular symmetric, linear, or left-right symmetric structures. In this way, the microstructures may be fabricated by a relatively simple method, and the uniform distribution of the microstructures is relatively simple. However, in order to take into account the full circle design of the microstructures, correspondingly, the size of the microstructures is relatively large. Therefore, regardless of whether optical films are provided on the light guide plate, the microstructures cannot be effectively shielded, resulting in pattern mura. Besides, due to the full arc design, it is impossible to repeatedly strengthen or abandon a specific arc angle to adjust the distribution of output light beams. Furthermore, fully circular, linear, or fully arc-shaped microstructures cannot be adjusted, so hot spot problems may occur easily.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a light guide element including a first surface, a second surface, a light-incident surface, and a plurality of microstructure groups. The second surface is opposite to the first surface. The light-incident surface is connected to the first surface and the second surface. The microstructure groups are arranged on the first surface. Each of the microstructure groups includes a first microstructure and a second microstructure. The first microstructure has a first light-receiving surface facing the light-incident surface. The second microstructure has a second light-receiving surface facing the light-incident surface. The first microstructure and the second microstructure are separated from each other. The first microstructure and the second microstructure are mirror image structures of each other. A light-incident intersection line is provided between the first surface and the light-incident surface. A first intersection line is provided between the first light-receiving surface of the first microstructure and the first surface. A first distance is provided between the first intersection line and the light-incident intersection line in a first direction. A second intersection line is provided between the second light-receiving surface of the second microstructure and the first surface. A second distance is provided between the second intersection line and the light-incident intersection line in the first direction. A variation trend of the first distance in a second direction is opposite to a variation trend of the second distance in the second direction. The first direction is perpendicular to the light-incident surface, and the second direction is parallel to the light-incident intersection line.

The disclosure further provides a backlight module including the light guide element and a light-emitting element. The light-emitting element is located beside the light-incident surface.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The aforementioned and other technical contents, features and effects of the present invention will be clearly presented in the following detailed description of a preferred embodiment with reference to the drawings. The directional terms mentioned in the following embodiments, such as up, down, left, right, front or back, etc., are only directions referring to the attached drawings. Accordingly, the directional terms used are for the purpose of illustration and not for the purpose of limiting the invention.

Figure 1:
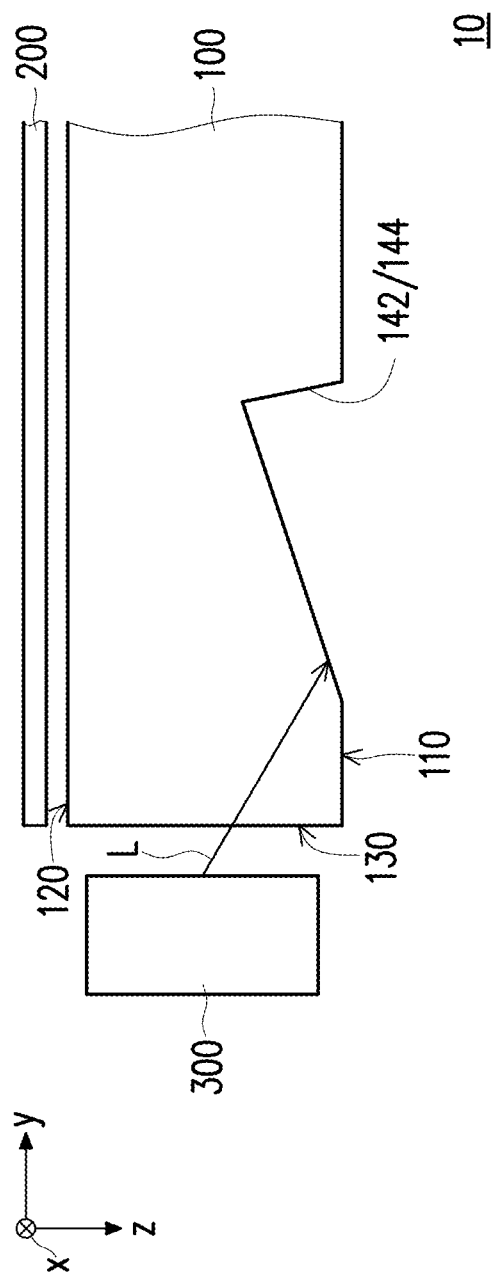
FIG. 1 is a cross-sectional schematic view of a backlight module according to a first embodiment of the disclosure.
Figure 2:
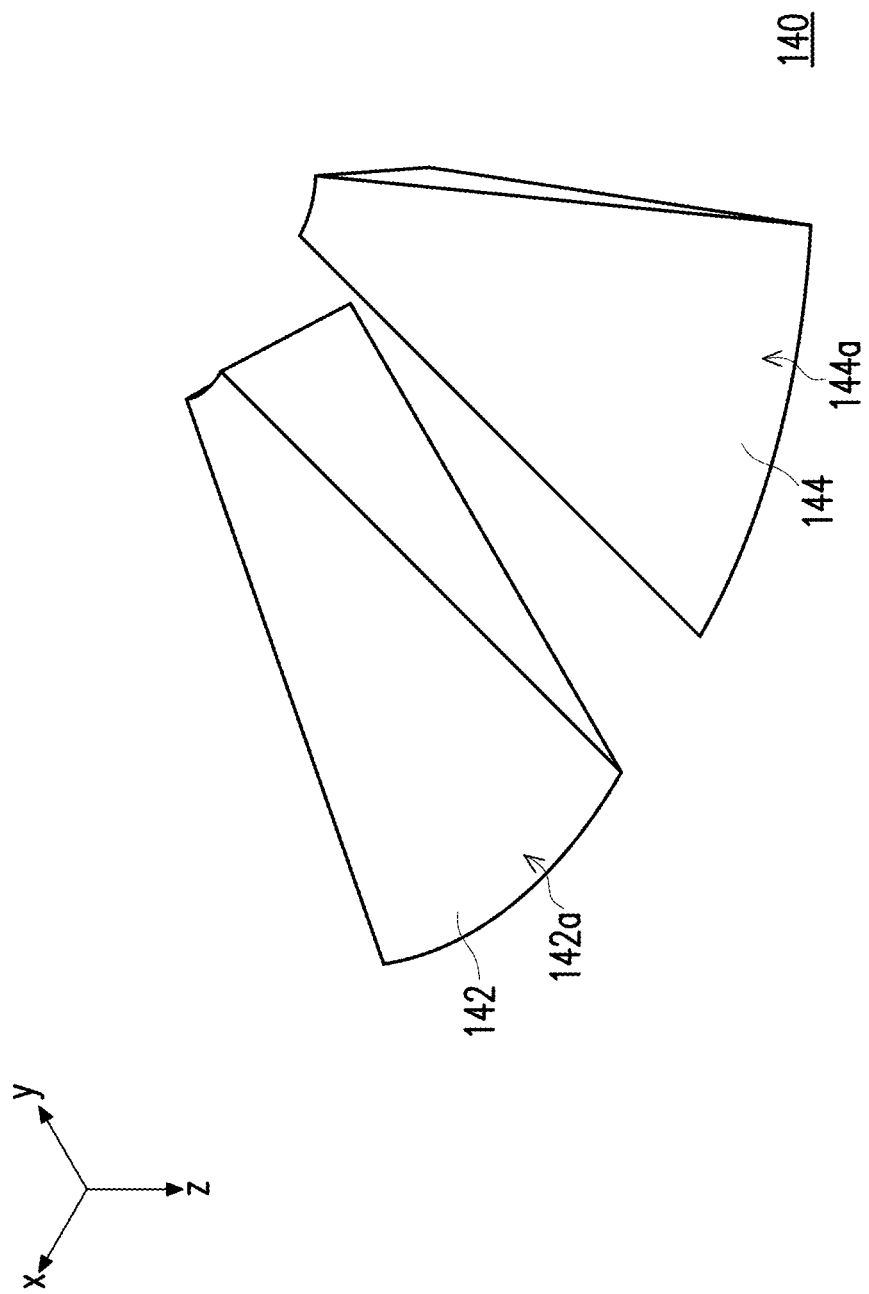
FIG. 2 is a three-dimensional schematic view of a microstructure group according to the first embodiment of the disclosure.
Figure 3:
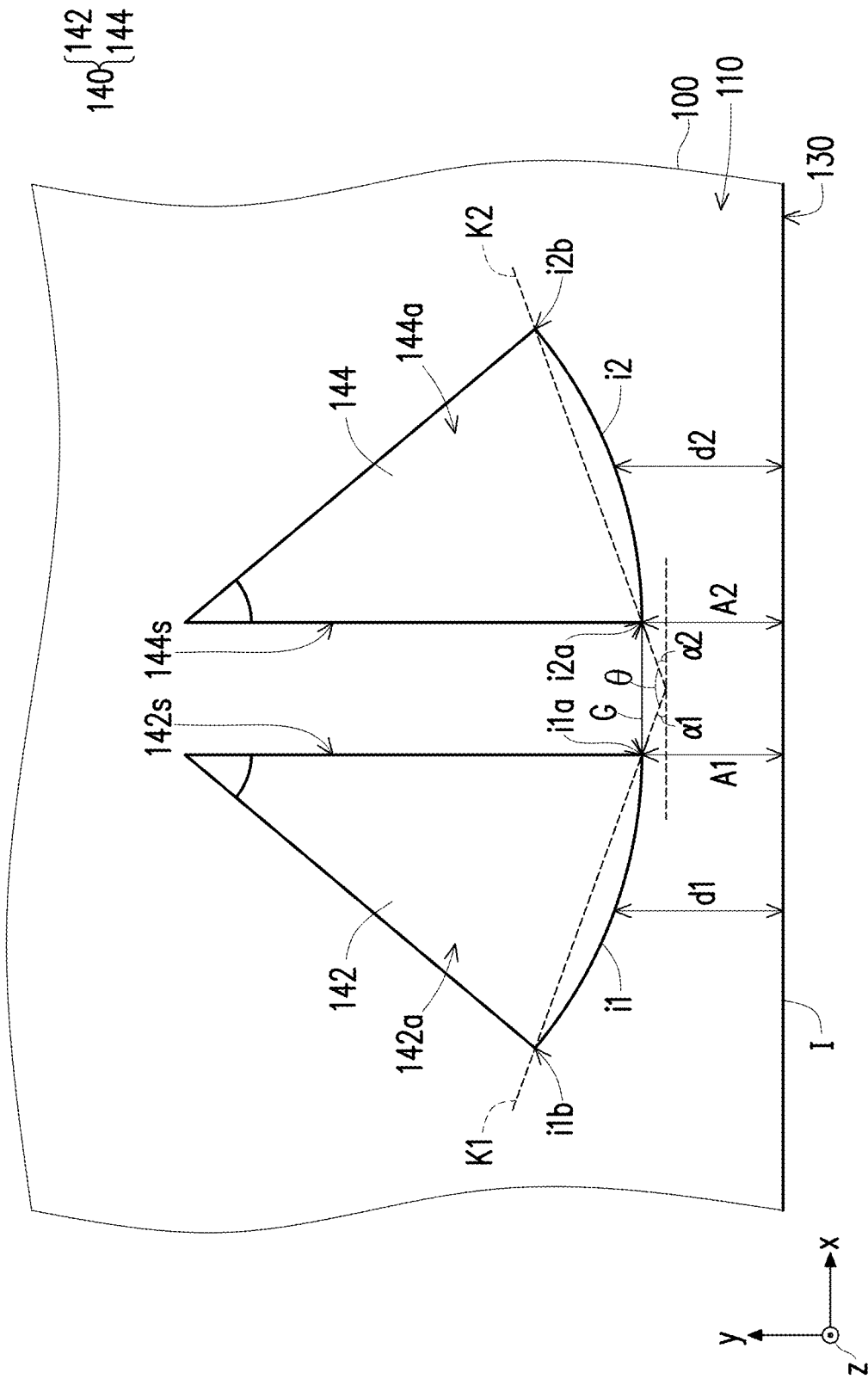
FIG. 3 is a bottom enlarged schematic view of the microstructure group according to the first embodiment of the disclosure.

FIG. 1 is a cross-sectional schematic view of a backlight module according to a first embodiment of the disclosure. FIG. 2 is a three-dimensional schematic view of a microstructure group according to the first embodiment of the disclosure. FIG. 3 is a bottom enlarged schematic view of the microstructure group according to the first embodiment of the disclosure. For the sake of clarity, a first direction y, a second direction x, and a third direction z are drawn perpendicular to each other in the figure, and FIG. 2 shows a concave structure.

With reference to FIG. 1, FIG. 2, and FIG. 3 together, a backlight module 10 includes a light guide element 100, at least one optical film 200, and at least one light-emitting element 300. With reference to FIG. 1 and FIG. 2, the light guide element 100 includes a first surface 110, a second surface 120, a light-incident surface 130, and a plurality of microstructure groups 140, and each of the microstructure groups 140 includes a first microstructure 142 and a second microstructure 144. The second surface 120 is opposite to the first surface 110. The light-incident surface 130 is connected between the first surface 110 and the second surface 120. The microstructure groups 140 are arranged on the first surface 110. In this embodiment, the first surface 110 is, for example, a bottom surface of the light guide element 100, the second surface is, for example, a light-emitting surface of the light guide element 100, and the microstructure groups 140 may be selectively recessed into the first surface 110. However, the disclosure is not limited thereto. In other embodiments, the microstructure groups 140 may also selectively protrude from the first surface 110.

The least one optical film 200 is located on one side of the second surface 120 of the light guide element 100. In this embodiment, the at least one optical film 200 may include a diffuser film, a prism sheet, a brightness enhancement film, other types of optical films, or a combination of at least two of the foregoing. To be specific, the at least one optical film 200 may allow light to pass through, but the disclosure is not limited thereto. The at least one light-emitting element 300 is located besides the light-incident surface 130 of the light guide element 100. The at least one light-emitting element 300 is used to emit a light beam L, and the light beam L enters the light guide element 100 from the light-incident surface 130 of the light guide element 100. For instance, in this embodiment, the at least one light-emitting element 300 may include at least one light-emitting diode, but the disclosure is not limited thereto. In other embodiments, the light-emitting element 300 may also be a light-source element of another type. It should be noted that, the light guide element 100 and the backlight module 10 of the embodiment of FIG. 1 are suitable for an edge-lit backlight display device. That is, a display panel (not shown) is arranged on one side of the second surface 120 (i.e., the at least one optical film 200 is arranged between the display panel and the light guide element 100). After being emitted from the backlight module 10 (the second surface 120), the light beam L passes through the display panel, so that a viewer can see a display image, but the disclosure is not limited thereto. In other embodiments, the light guide element 100 is also suitable for a front light display device. That is, the display panel is a reflective display panel (not shown) and is arranged on one side of the second surface 120, and no optical film is arranged between the display panel and the light guide element 100. The light beam L is emitted from the backlight module 10 (second surface 120) and then is transmitted to the display panel. The light beam L is reflected by the display panel and passes through the light guide element 100, allowing the viewer to see the display image.

In this embodiment, in each of the microstructure groups 140, the first microstructure 142 and the second microstructure 144 are separated from each other, and the first microstructure 142 and the second microstructure 144 are mirror image structures of each other (i.e., the first microstructure 142 is mirror symmetrical with respect to the second microstructure 144, as shown in FIG. 3).

It should be noted that being mirror image structures means that, for a reference plane (e.g., the plane where the first direction y and the third direction z are located) perpendicular to the second surface 120 and the light-incident surface 130, the first microstructure 142 and the second microstructure 144 of the same microstructure group 140 are mirror images of each other.

Figure 4:
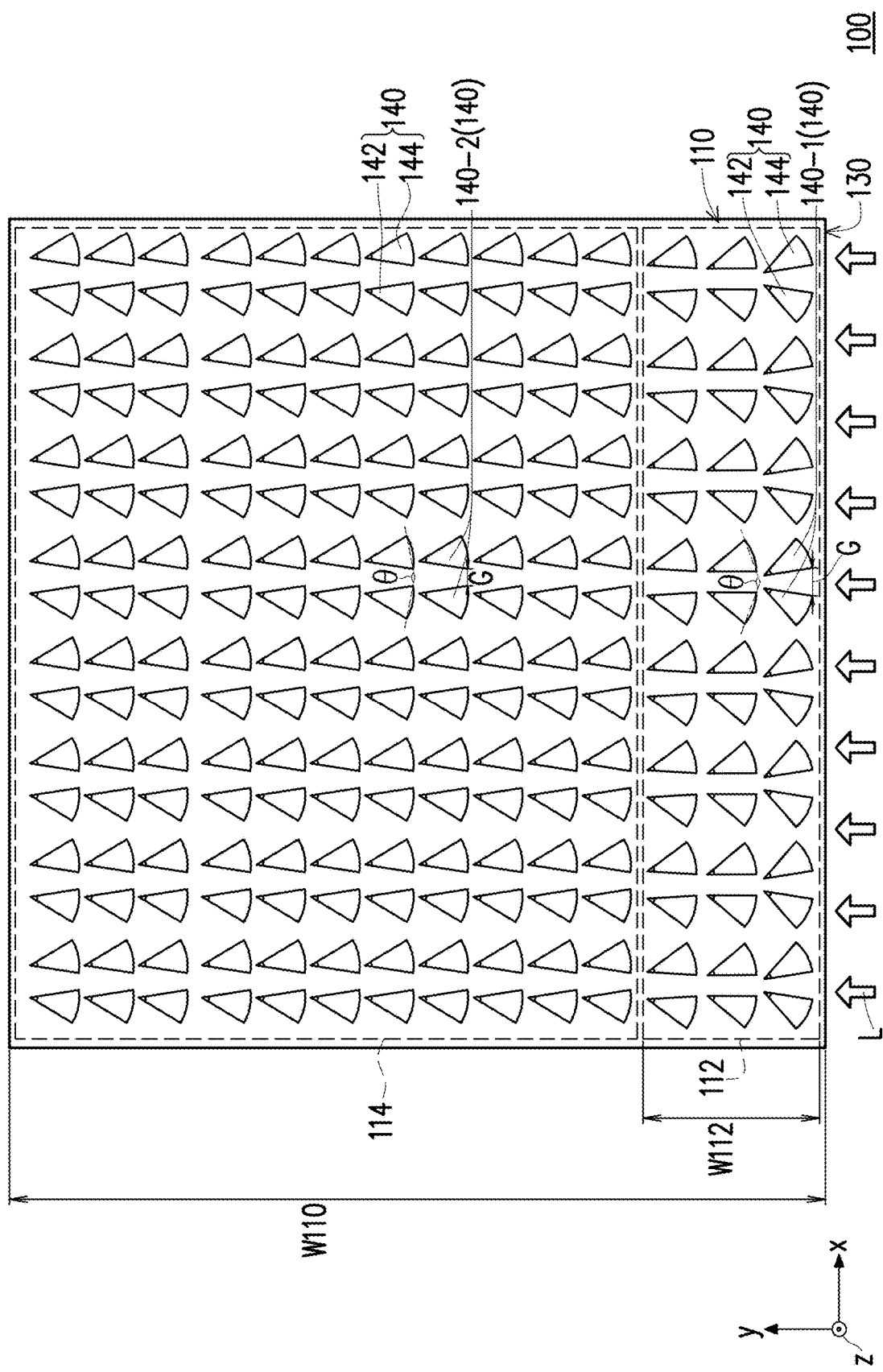
FIG. 4 is a bottom schematic view of a light guide element according to the first embodiment of the disclosure.

For instance, FIG. 4 is a bottom schematic view of a light guide element according to the first embodiment of the disclosure. With reference to FIG. 1, FIG. 2, FIG. 3, and FIG. 4, together, in this embodiment, the first microstructure 142 and the second microstructure 144 of the same microstructure group 140 are adjacent to each other (for example, the first microstructure 142 is the microstructure closest to the second microstructure 144).

Further, the first microstructure 142 and the second microstructure 144 of each of the microstructure groups 140 respectively have a first light-receiving surface 142a facing the light-incident surface 130 and a second light-receiving surface 144a facing the light-incident surface 130. The first light-receiving surface 142a and the second light-receiving surface 144a are suitable for guiding the light beam L to the second surface 120 and to leave the light guide element 100 from the second surface 120. A light-incident intersection line I (marked in FIG. 3) is provided between the first surface 110 and the light-incident surface 130 (i.e., the light-incident intersection line I is an intersection line of the first surface 110 and the light-incident surface 130), the first direction y is perpendicular to the light-incident surface 130, and the second direction x is parallel to the light-incident intersection line I. A first intersection line i1 is provided between the first light-receiving surface 142a of the first microstructure and the first surface 110, and a first distance d1 is provided between the first intersection line i1 and the light-incident intersection line I in the first direction y. A second intersection line i2 is provided between the second light-receiving surface 144a of the second microstructure 144 and the first surface 110, and a second distance d2 is provided between the second intersection line i2 and the light-incident intersection line I in the first direction y. Herein, a variation trend of the first distance d1 in the second direction x is opposite to a variation trend of the second distance d2 in the second direction x. For instance, in this embodiment, the first distance d1 between the first intersection line i1 and the light-incident intersection line I gradually decreases in the second direction x, and the second distance d2 between the second intersection line i2 and the light-incident intersection line I gradually increases in the second direction x. In other words, a distribution curve of an absolute value of a variation value of the first distance d1 in the second direction x is opposite to a distribution curve of an absolute value of a variation value of the second distance d2 in the second direction x.

Further, for a reference plane perpendicular to the second surface 120 and the light-incident surface 130, the first intersection line i1 and the second intersection line i2 are mirror symmetry curves, but the disclosure is not limited thereto.

With reference to FIG. 1, FIG. 2, FIG. 3, and FIG. 4, together, it is worth mentioning that since one microstructure group 140 is divided into the first microstructure 142 and the second microstructure 144 separated from each other, a size of a single first microstructure 142 and a size of a single second microstructure 144 are relatively small. In this way, pattern mura of the backlight module 10 may be eliminated or alleviated. In addition, by changing the sizes of the first microstructure 142 and the second microstructure 144 of each of the microstructure groups 140, the forward output light energy may be adjusted to increase the luminance. On the other hand, by changing the sizes of the first microstructure 142 and the second microstructure 144 of each of the microstructure groups 140, a viewing angle of the output light may also be adjusted appropriately.

In this embodiment, the microstructure groups 140 may be evenly distributed on the first surface 110. In each of the microstructure groups 140, the first microstructure 142 is adjacent to the second microstructure 144. In each of the microstructure groups 140, the first intersection line i1 of the first microstructure 142 has a first end point i1a close to the second microstructure 144 (as shown in FIG. 3, the first end point i1a is an end point of the first intersection line i1 close to a right side of the light guide element 100), and the second intersection line i2 of the second microstructure 144 has a second end point i2a close to the first microstructure 142 (as shown in FIG. 3, the second end point i2a is an end point of the second intersection line i2 close to a left side of the light guide element 100, and the left side of the light guide element 100 points to the direction of the right side, for example, parallel to the second direction x). A distance A1 between the first end point i1a and the light-incident intersection line I is equal to a distance A2 between the second end point i2a and the light-incident intersection line I. A gap G is provided between the first end point i1a and the second end point i2a in the second direction x, and the gap G of each of the microstructure groups 140 increases or remains unchanged as the distance A1 between the first end point i1a and the light-incident intersection line I decreases. In this way, hot spot may be eliminated or alleviated.

Further, the first intersection line i1 between the first light-receiving surface 142a of the first microstructure 142 of each of the microstructure groups 140 and the first surface 110 has a first outer end point i1b away from the second microstructure 144 (as shown in FIG. 3, the first outer end point i1b is the end point of the first intersection line i1 close to the left side of the light guide element 100). The second intersection line i2 between the second light-receiving surface 144a of the second microstructure 144 of each of the microstructure groups 140 and the first surface 110 has a second outer end point i2b away from the first microstructure 142 (as shown in FIG. 3, the second outer end point i2b is the end point of the second intersection line i2 close to the right side of the light guide element 100). A first connecting line K1 connects the first end point i1a and the first outer end point i1b, and a second connecting line K2 connects the second end point i2a and the second outer end point i2b. Herein, in each of the microstructure groups 140, an included angle θ between the first connecting line K1 and the second connecting line K2 decreases or remains unchanged as the distance A1 between the first end point i1a and the light-incident intersection line I decreases. Further, in this embodiment, an included angle α1 between the first connecting line K1 of each of the microstructure groups 140 and the light-incident intersection line I and an included angle α2 between the second connecting line K2 of each of the microstructure groups 140 and the light-incident intersection line I may be the same. That is, in this embodiment, for a reference plane perpendicular to the light-incident surface 130 and the second surface 120 (i.e., the plane where the first direction y and the third direction z are located), the first microstructure 142 and the second microstructure 144 of the same microstructure group 140 rotate by the same angle towards the two opposite outer sides of the reference plane, and the first microstructure 142 and the second microstructure 144 of the microstructure group 140 that are closer to the light-incident surface 130 rotate towards the outer sides to a greater extent. In other words, taking the first direction y and the second direction x in FIG. 3 as coordinate axes, a slope of the first connecting line K1 is negative, a slope of the second connecting line K2 is positive, and an absolute value of the slope of the first connecting line K1 is equal to an absolute value of the slope of the second connecting line K2.

In this embodiment, the increase or decrease of the distances G of the microstructure groups 140 is caused by the change of the rotation angles of the first microstructures 142 and the second microstructures 144. It should be noted that the patterns of the first microstructures 142 are the same, and only the rotation angles relative to the light-incident surface 130 are different. The patterns of the second microstructures 144 are the same, only the rotation angles relative to the light-incident surface 130 are different.

To be specific, with reference to FIG. 4, in this embodiment, the first surface 110 of the light guide element 100 has a first arrangement region 112 and a second arrangement region 114. The first arrangement region 112 is located between the light-incident surface 130 and the second arrangement region 114, and a width W112 of the first arrangement region 112 in the first direction y is, for example, 5% to 99% of a width W110 of the first surface 110 in the first direction y. The microstructure groups 140 include a plurality of first microstructure groups 140-1 and a plurality of second microstructure groups 140-2 respectively arranged in the first arrangement region 112 and the second arrangement region 114. The gaps G of the first microstructure groups 140-1 decrease gradually as the distance from the light-incident surface 130 increases (the slopes of the first connecting lines K1 gradually become smaller as the distance from the light-incident surface 130 increases, and the slopes of the second connecting lines K2 gradually become smaller in as the distance from the light-incident surface 130 increases). The gaps G of the second microstructure groups 140-2 are the same, and the gap G of each of the second microstructure groups 140-2 is less than or equal to the gap G of each of the first microstructure groups 140-1 (the slope of the second connecting line K2 of each of the second microstructure groups 140-2 is less than or equal to the slope of the second connecting line K2 of each of the first microstructure groups 140-1, and the included angle θ between the first connecting line K1 and the second connecting line K2 of each of the first microstructure groups 140-1 arranged in the first arrangement region 112 is smaller than the included angle θ between the first connecting line K1 and the second connecting line K2 of each of the second microstructure groups 140-2 arranged in the second arrangement region 114). In this way, the hot spots on the light-incident side of the light guide element 100 may solved, and at the same time, and the uniformity of the output light of the light guide element 100 may be achieved.

It should be noted that in other embodiments, the first surface 110 of the light guide element 100 may be provided with the first arrangement region 112 only. That is, the microstructure groups 140 are uniformly distributed on the first surface 110. In each of the microstructure groups 140, the gap G between the first end point i1a of the first intersection line i1 of the first microstructure 142 and the second end point i2a of the second intersection line i2 of the second microstructure 144 in the second direction x increases as the distance A1 between the first end point i1a and the light-incident intersection line I decreases (the slope of the second connecting line K2 increases as the distance A1 between the first end point i1a and the light-incident intersection line I decreases).

It should be noted that the reference numerals and a part of the contents in the previous embodiment are used in the following embodiments, in which identical reference numerals indicate identical or similar components, and repeated description of the same technical contents is omitted. Please refer to the description of the previous embodiments for the omitted content, which will not be repeated hereinafter.

Figure 5:
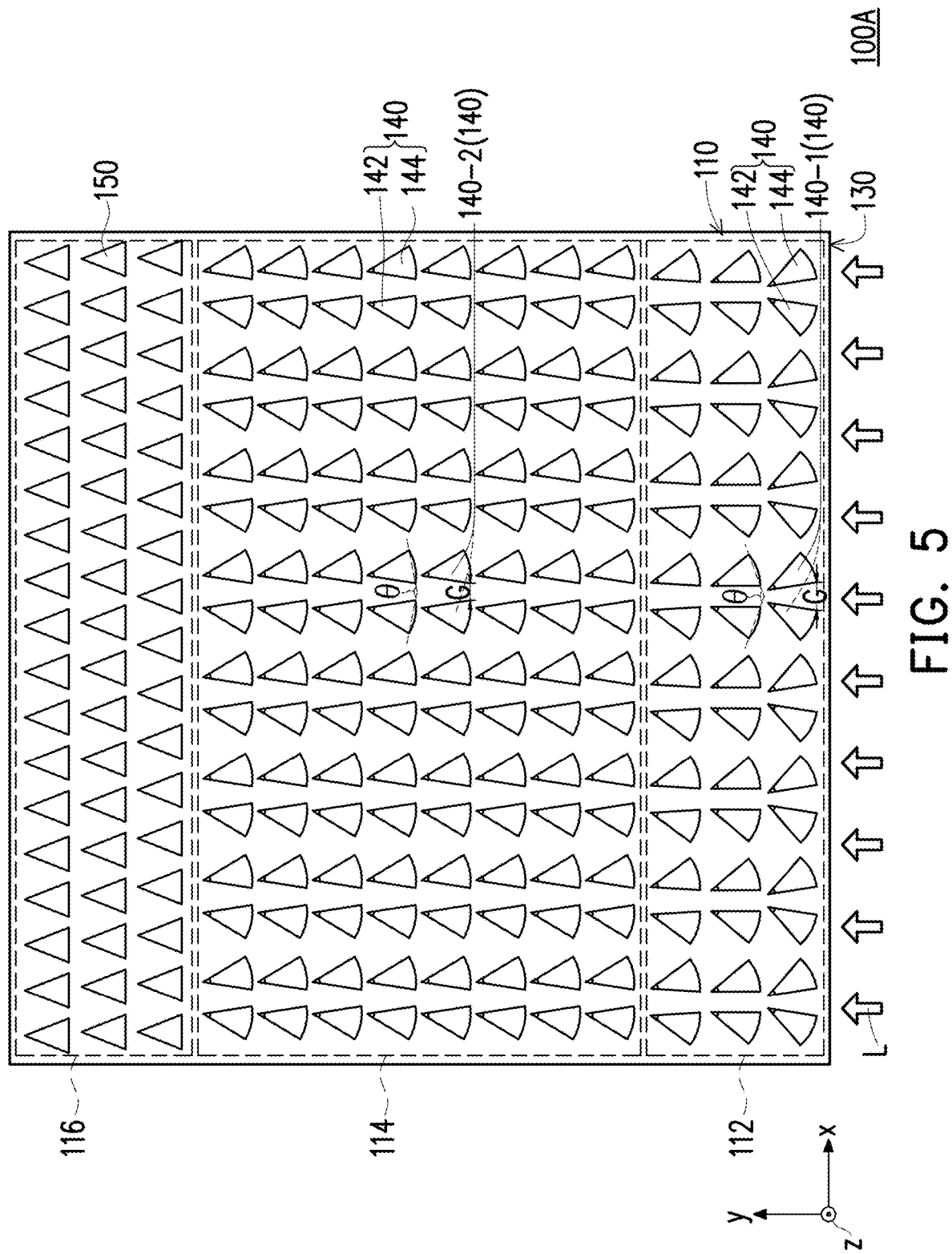
FIG. 5 is a bottom schematic view of a light guide element according to a second embodiment of the disclosure.

FIG. 5 is a bottom schematic view of a light guide element according to a second embodiment of the disclosure. A light guide element 100A of FIG. 5 is similar to the light guide element 100 of FIG. 4, and the differences therebetween are described as follows. With reference to FIG. 5, in this embodiment, the first surface 110 further includes a third arrangement region 116, and the second arrangement region 114 is located between the first arrangement region 112 and the third arrangement region 116. The light guide element 100A further includes a plurality of auxiliary microstructures 150, and the auxiliary microstructures 150 are arranged in the third arrangement region 116 of the first surface 110. The auxiliary microstructures 150 may be protruded or recessed into the third arrangement region 116 of the first surface 110. Herein, an orthographic projection of each of the auxiliary microstructures 150 on the first surface 110 is different from an orthographic projection of each of the first microstructures 142 on the first surface 110. The orthographic projection of each of the auxiliary microstructures 150 on the first surface 110 is different from an orthographic projection of each of the second microstructures 144 on the first surface 110 as well. In short, the auxiliary microstructures 150 are optical microstructures different from the first microstructures 142 and the second microstructures 144. In this embodiment, each of the auxiliary microstructures 150 may be a symmetrical structure. In detail, for a reference plane (i.e., the plane where the first direction y and the third direction z are located), the connected left and right halves of each of the auxiliary microstructures 150 can be mirror symmetrical with respect to each other. It should be noted that in other embodiments, the first surface 110 of the light guide element 100A may be provided with the first arrangement region 112 and the third arrangement region 116 only.

Figure 6:
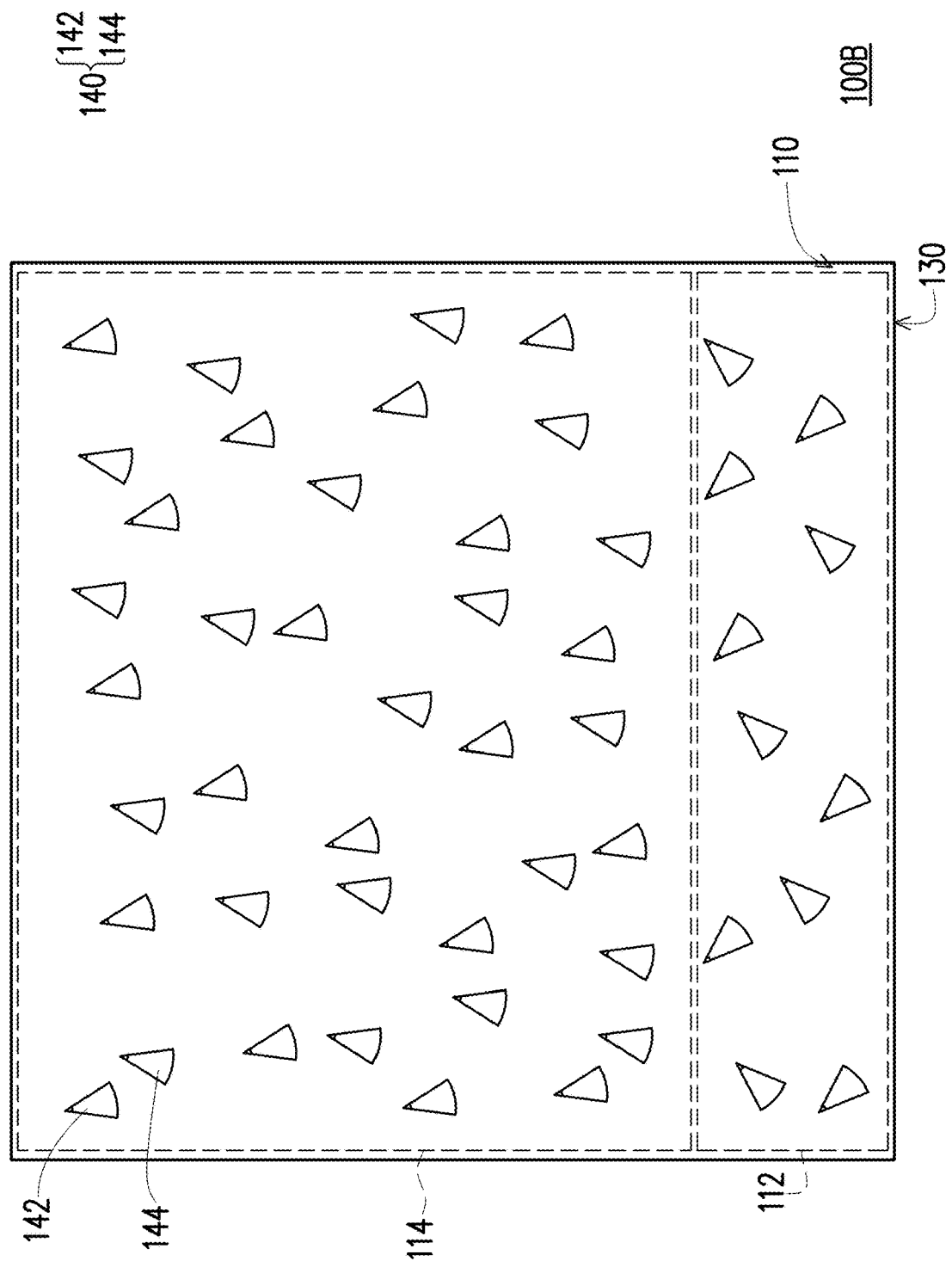
FIG. 6 is a bottom schematic view of a light guide element according to a third embodiment of the disclosure.
Figure 7:
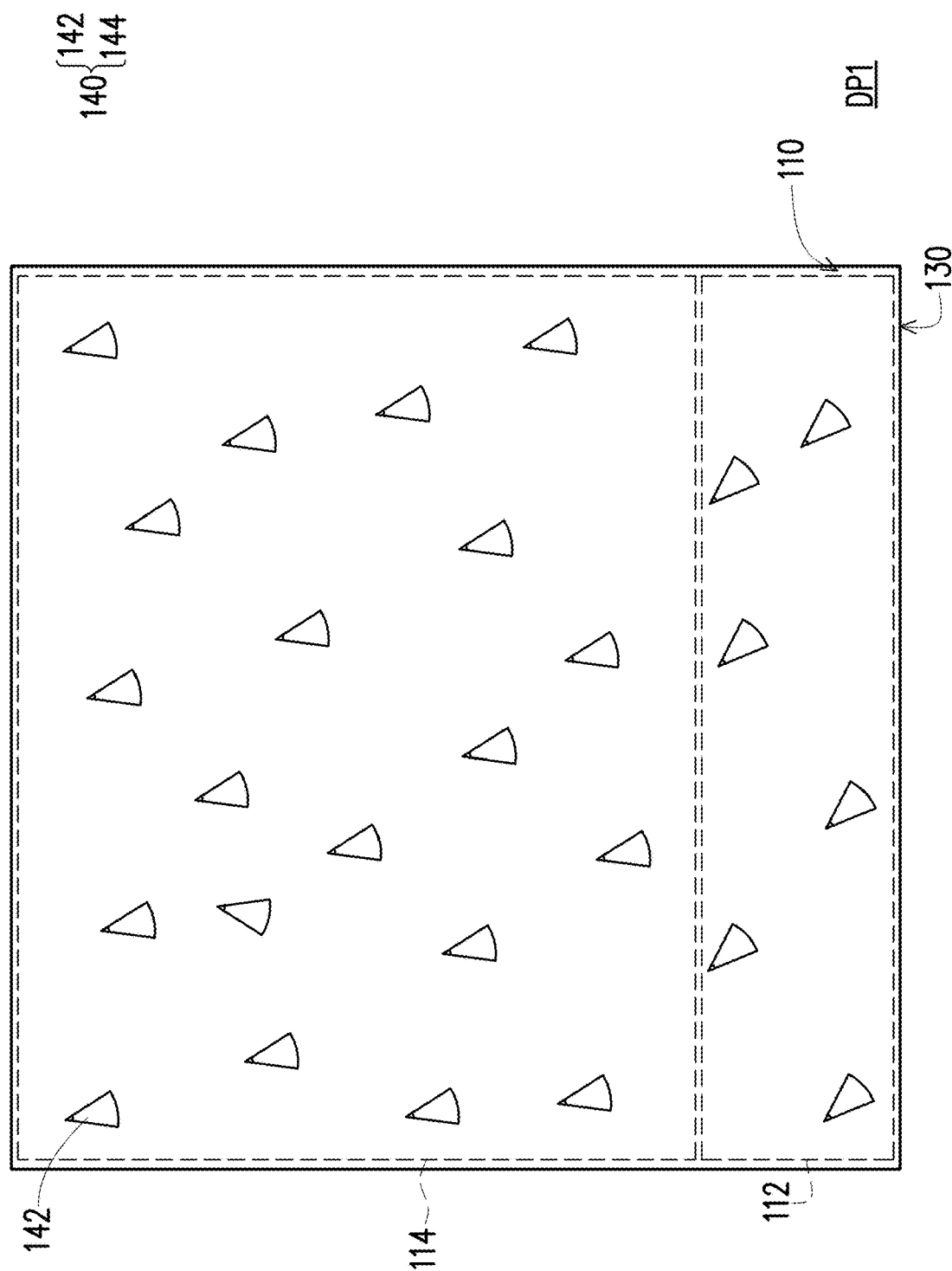
FIG. 7 is a bottom schematic view of first microstructures of the light guide element of FIG. 6.
Figure 8:
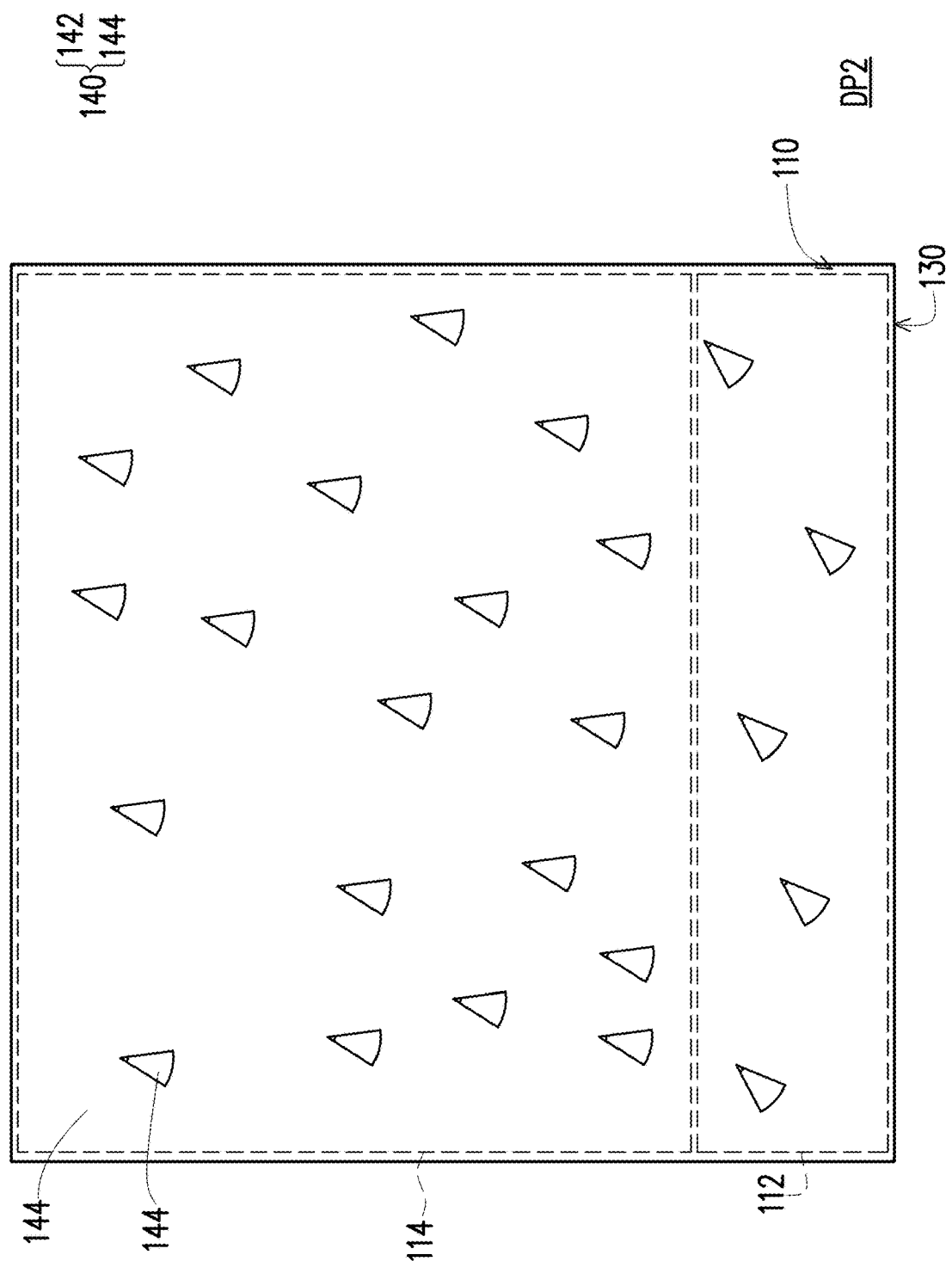
FIG. 8 is a bottom schematic view of second microstructures of the light guide element of FIG. 6.

FIG. 6 is a bottom schematic view of a light guide element according to a third embodiment of the disclosure. FIG. 7 is a bottom schematic view of first microstructures of the light guide element of FIG. 6. FIG. 8 is a bottom schematic view of second microstructures of the light guide element of FIG. 6. A light guide element 100B of FIG. 6 is similar to the light guide element 100 of FIG. 4, and the differences therebetween are described as follows.

With reference to FIG. 6, in this embodiment, the first microstructures 142 are distributed on the first surface 110, and the second microstructures 144 are distributed on the first surface 110. The first microstructures 142 and the second microstructures 144 are randomly distributed on the first surface 110, for example. The first microstructures 142 form a first distribution pattern DP1 (as shown in FIG. 7), and the slopes of the first connecting lines K1 (marked in FIG. 3) of the first microstructures 142 are negative, and the slopes gradually decrease or remain the same as the distance from the light-incident surface 130 increases. The second microstructures 144 form a second distribution pattern DP2 (as shown in FIG. 8), and the slopes of the second connecting lines K2 (marked in FIG. 3) of the second microstructures 144 are positive, and the slopes gradually decrease or remain the same as the distance from the light-incident surface 130 increases. The first distribution pattern DP1 and the second distribution pattern DP2 are different and are not mirror symmetrical with respect to each other.

Similarly, in other embodiments, the first surface 110 of the light guide element 100B may be provided with the first arrangement region 112 only. That is, the first microstructures 142 and the second microstructures 144 are both distributed on the entire first surface 110. Further, the slopes of the first connecting lines K1 of the first microstructures 142 gradually become smaller as the distance from the light-incident surface 130 increases, and the slopes of the second connecting lines K2 of the second microstructures 144 gradually become smaller as the distance from the light-incident surface 130 increases. In an embodiment, a distribution density of the first microstructures 142 on the first surface 110 gradually increases from the light-incident surface 130 as the distance from the light-incident surface 130 increases (i.e., in the first direction y). A distribution density of the second microstructures 144 on the first surface 110 gradually increases from the light-incident surface 130 in as the distance from the light-incident surface 130 increases.

It should be noted that in the embodiment of FIG. 6 (see the reference numerals in FIG. 3 as well), the first microstructure 142 and the second microstructure 144 of the same microstructure group 140 refer to the two structures in which the distance A1 between the first end point i1a and the light-incident intersection line I is equal to (or the difference is within 5%) the distance A2 between the second end point i2a and the light-incident intersection line I. The first microstructure 142 of the same microstructure group 140 is not necessarily adjacent to the second microstructure 144 (for example, the left and right adjacent microstructures of the first microstructure 142 are not necessarily two second microstructures 144). The slope of the first connecting line K1 is negative, the slope of the second connecting line K2 is positive, and the absolute value of the slope of the first connecting line K1 is equal to (or the difference is within 5%) the absolute value of the slope of the second connecting line K2. In this way, the first microstructure 142 and the second microstructure 144 are separated from each other. Further, the gap between the first microstructure 142 and the second microstructure 144 of different microstructure groups 140 at the same distance from the light-incident surface 130 may be different (the difference in gap is caused by the translation of each microstructure in the second direction x, for example). In this way, pattern mura may be further eliminated or alleviated.

Figure 9:
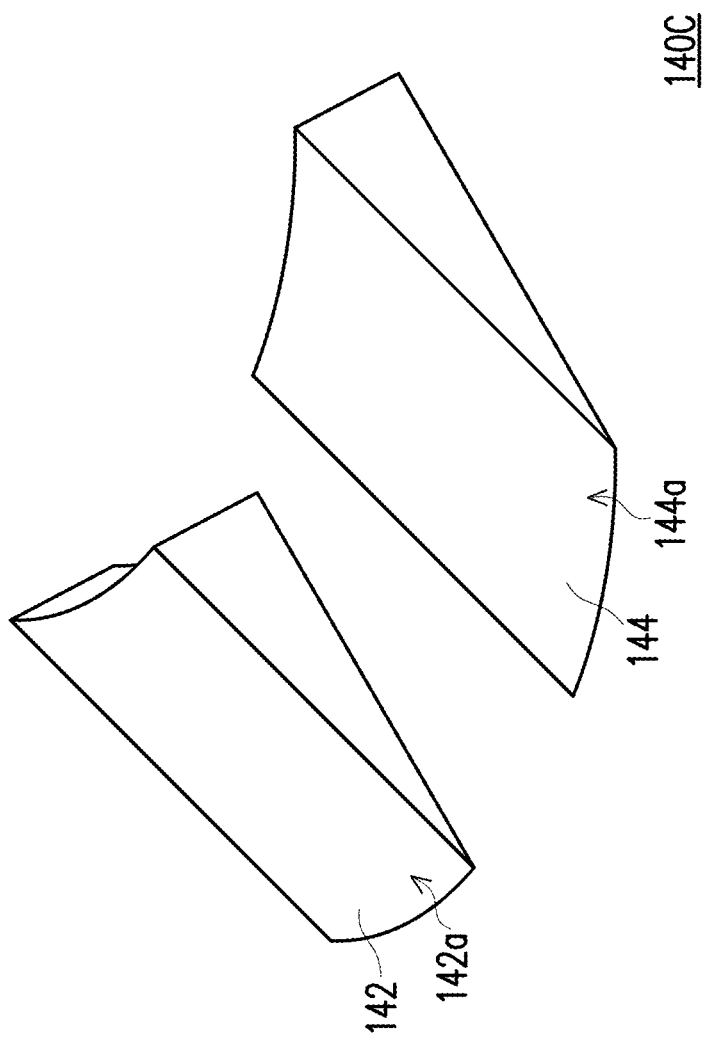
FIG. 9 is a three-dimensional schematic view of a microstructure group according to a fourth embodiment of the disclosure.
Figure 10:
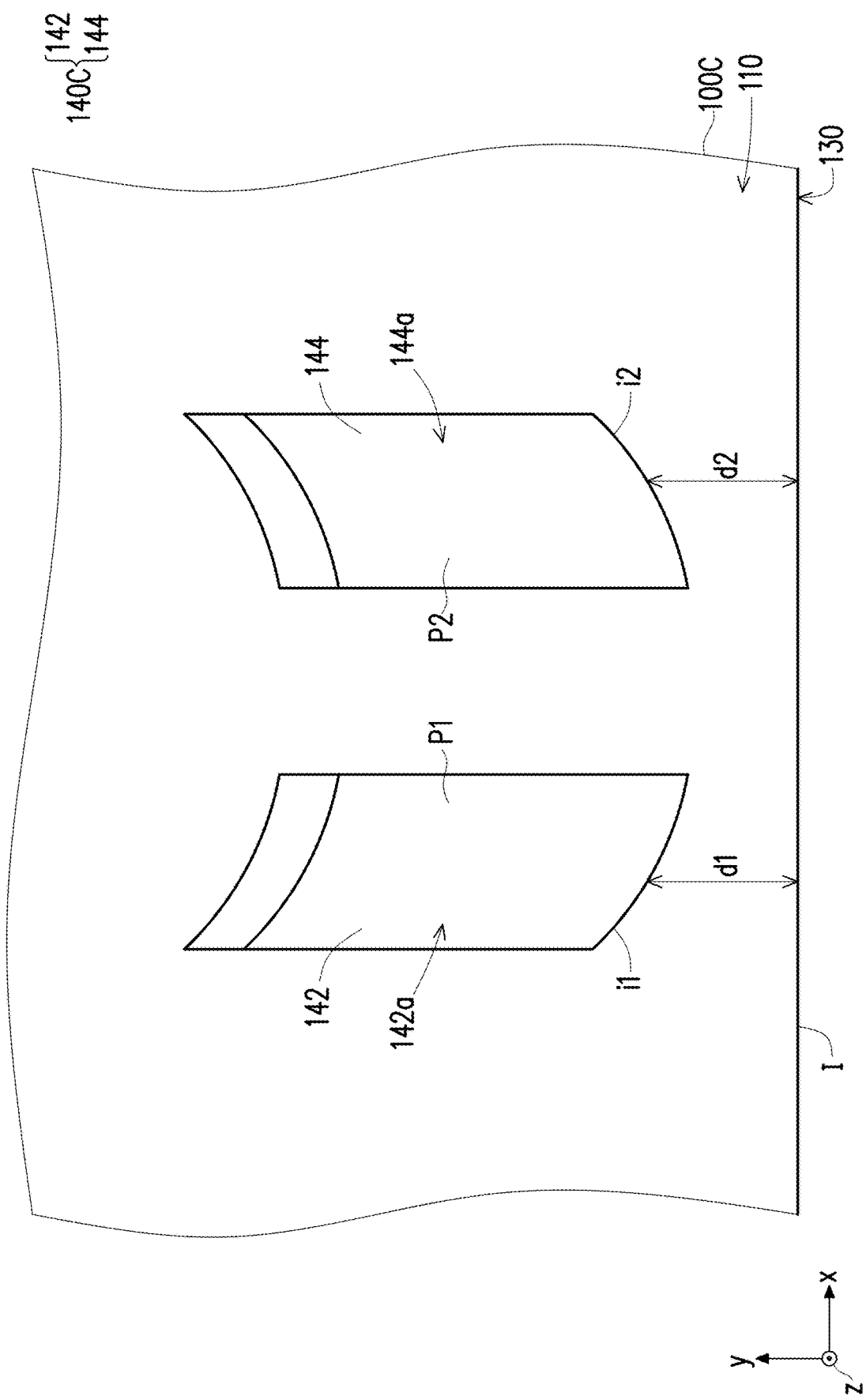
FIG. 10 is a bottom enlarged schematic view of the microstructure group of a light guide element according to the fourth embodiment of the disclosure.

FIG. 9 is a three-dimensional schematic view of a microstructure group according to a fourth embodiment of the disclosure. FIG. 10 is a bottom enlarged schematic view of the microstructure group of a light guide element according to the fourth embodiment of the disclosure. A microstructure group 140C of a light guide element 100C of FIG. 9 and FIG. 10 is similar to the microstructure group 140 of the light guide element 100 of FIG. 2 and FIG. 3, and the differences therebetween are described as follows.

With reference to FIG. 9 and FIG. 10, in this embodiment, an orthographic projection of the first light-receiving surface 142a of the first microstructure 142 on the first surface 110 is a first pattern P1, and the first pattern P1 is an asymmetrical pattern. In this embodiment, an orthographic projection of the second light-receiving surface 144a of the second microstructure 144 on the first surface 110 is a second pattern P2, and the second pattern P2 is an asymmetrical pattern. It should be noted that an asymmetrical pattern refers to a pattern that itself does not have an axis of symmetry. By setting the orthographic projection of the light-receiving surface as an asymmetrical pattern design, it is possible to adjust and repeatedly strengthen or abandon a specific arc angle of the light-receiving surface (the intersection line of the light-receiving surface) to adjust a distribution of output light beams to a different type. In addition, in this embodiment, a radius of curvature of the first intersection line i1 is not constant, and a radius of curvature of the second intersection line i2 is also not constant. In the second direction x, a first distribution curve of the radius of curvature of the first intersection line i1 is opposite to a second distribution curve of the radius of curvature of the second intersection line i2. For instance, in the second direction x, the radius of curvature of the first intersection line i1 gradually increases, and the radius of curvature of the second intersection line i2 gradually decreases.

Figure 11:
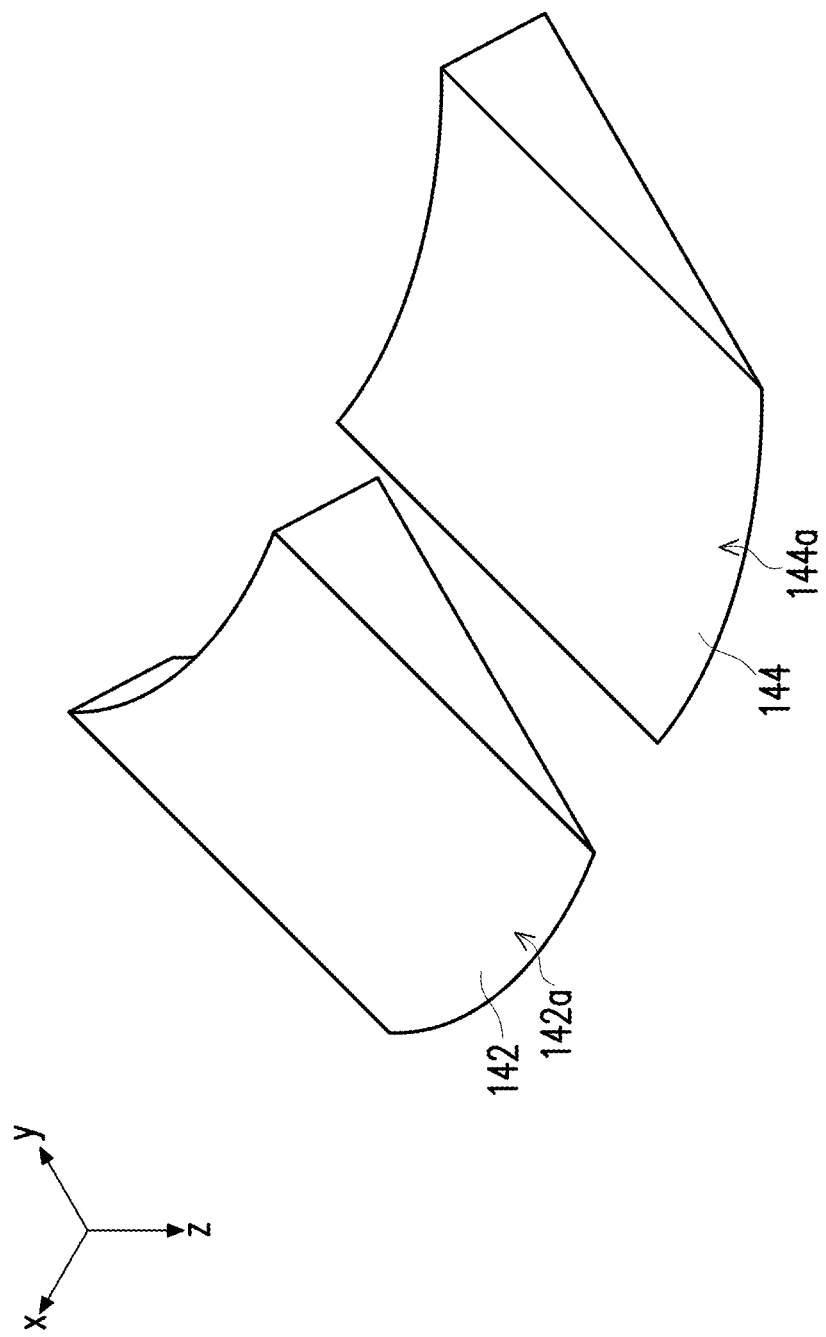
FIG. 11 is a three-dimensional schematic view of a microstructure group according to a fifth embodiment of the disclosure.
Figure 12:
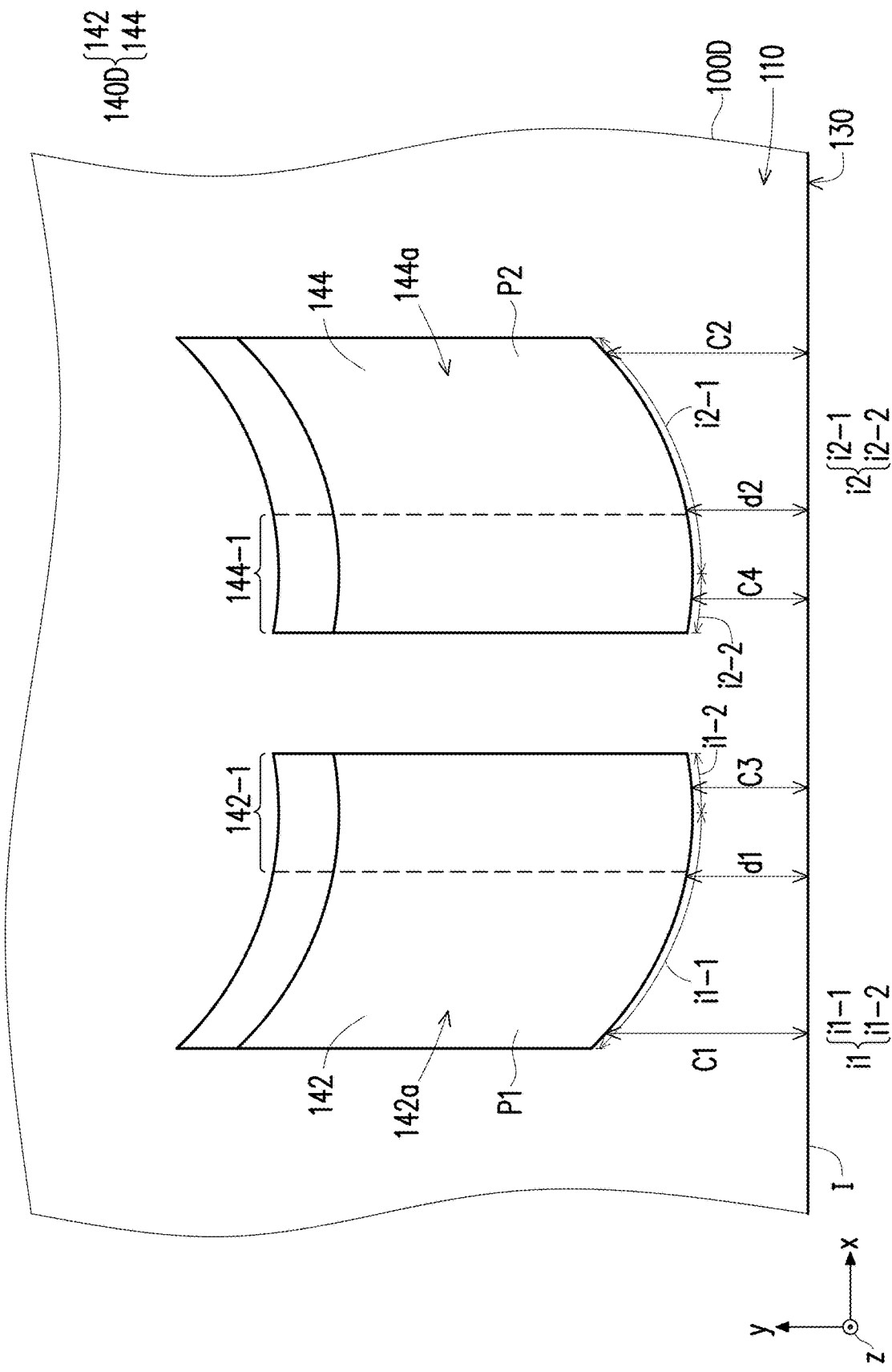
FIG. 12 is a bottom enlarged schematic view of the microstructure group of a light guide element according to the fifth embodiment of the disclosure.

FIG. 11 is a three-dimensional schematic view of a microstructure group according to a fifth embodiment of the disclosure. FIG. 12 is a bottom enlarged schematic view of the microstructure group of a light guide element according to the fifth embodiment of the disclosure. A microstructure group 140D of a light guide element 100D of FIG. 11 and FIG. 12 is similar to the microstructure group 140C of the light guide element 100C of FIG. 9 and FIG. 10, and the differences therebetween are described as follows.

With reference to FIG. 11 and FIG. 12, the first distribution curve of the radius of curvature of the first intersection line i1 is opposite to the second distribution curve of the radius of curvature of the second intersection line i2. The first pattern P1 is an asymmetrical pattern, and the second pattern P2 is an asymmetrical pattern. Difference from the embodiment of FIG. 9 and FIG. 10, in the embodiment of FIG. 11 and FIG. 12, a portion of the first distribution curve is the same as a portion of the second distribution curve. For instance, in this embodiment, the portion of the first distribution curve may account for more than 5% and less than 20% of the entire first distribution curve, and the portion of the second distribution curve may account for more than 5% and less than 20% of the entire second distribution curve.

In the embodiment of FIG. 11 and FIG. 12, a portion 142-1 of the first microstructure 142 and a portion 144-1 of the second microstructure 144 may have the same structure. A portion of the first intersection line i1 included in the portion 142-1 of the first microstructure 142 and a portion of the second intersection line i2 included in the portion 144-1 of the second microstructure 144 may have the same curve.

Further, in this embodiment, the first intersection line i1 includes a first segment i1-1 and a second segment i1-2 connected to each other, and the second intersection line i2 includes a third segment i2-1 and a fourth segment i2-2 connected to each other. The second segment i1-2 is located between the first segment i1-1 and the fourth segment i2-2, and the fourth segment i2-2 is located between the second segment i1-2 and the third segment i2-1. A first distance C1 is provided between the first segment i1-1 of the first intersection line i1 and the light-incident intersection line I in the first direction y. A second distance C2 is provided between the third segment i2-1 of the second intersection line i2 and the light-incident intersection line I in the first direction y. A third distance C3 is provided between the second segment i1-2 of the first intersection line i1 and the light-incident intersection line I in the first direction y. A fourth distance C4 is provided between the fourth segment i2-2 of the second intersection line i2 and the light-incident intersection line I in the first direction y. The first distance C1 gradually decreases in the second direction x, the second distance C2 gradually increases in the second direction x, the third distance C3 gradually increases in the second direction x, and the fourth distance C4 gradually decreases in the second direction x.

It should be noted that if the first intersection line i1 and the second intersection line i2 of the embodiment of FIG. 10 are translated to allow the first intersection line i1 and the second intersection line i2 to be connected form a connection curve (as shown in FIG. 3, the end point i1a is connected to the end point i2a), the slope of the tangent line of the connection curve exhibits discontinuity. Further, the first distribution curve of the radius of curvature of the first intersection line i1 and the second distribution curve of the radius of curvature of the second intersection line i2 do not have overlapping portions. That is, in the embodiment of FIG. 10, a reflective surface facing the light-incident surface 130 is not provided. In contrast, in the embodiment of FIG. 12, the first distribution curve of the radius of curvature of the first intersection line i1 and the second distribution curve of the radius of curvature of the second intersection line i2 have overlapping portions. That is, in the embodiment of FIG. 12, the reflective surface facing the light-incident surface 130 is repeated. In this way, through the design of the first microstructure 142 and the second microstructure 144, it is possible to adjust and repeatedly strengthen or abandon a specific arc angle of the light-receiving surface (the intersection line of the light-receiving surface) to adjust a distribution of output light beams to a different type.

Figure 13:
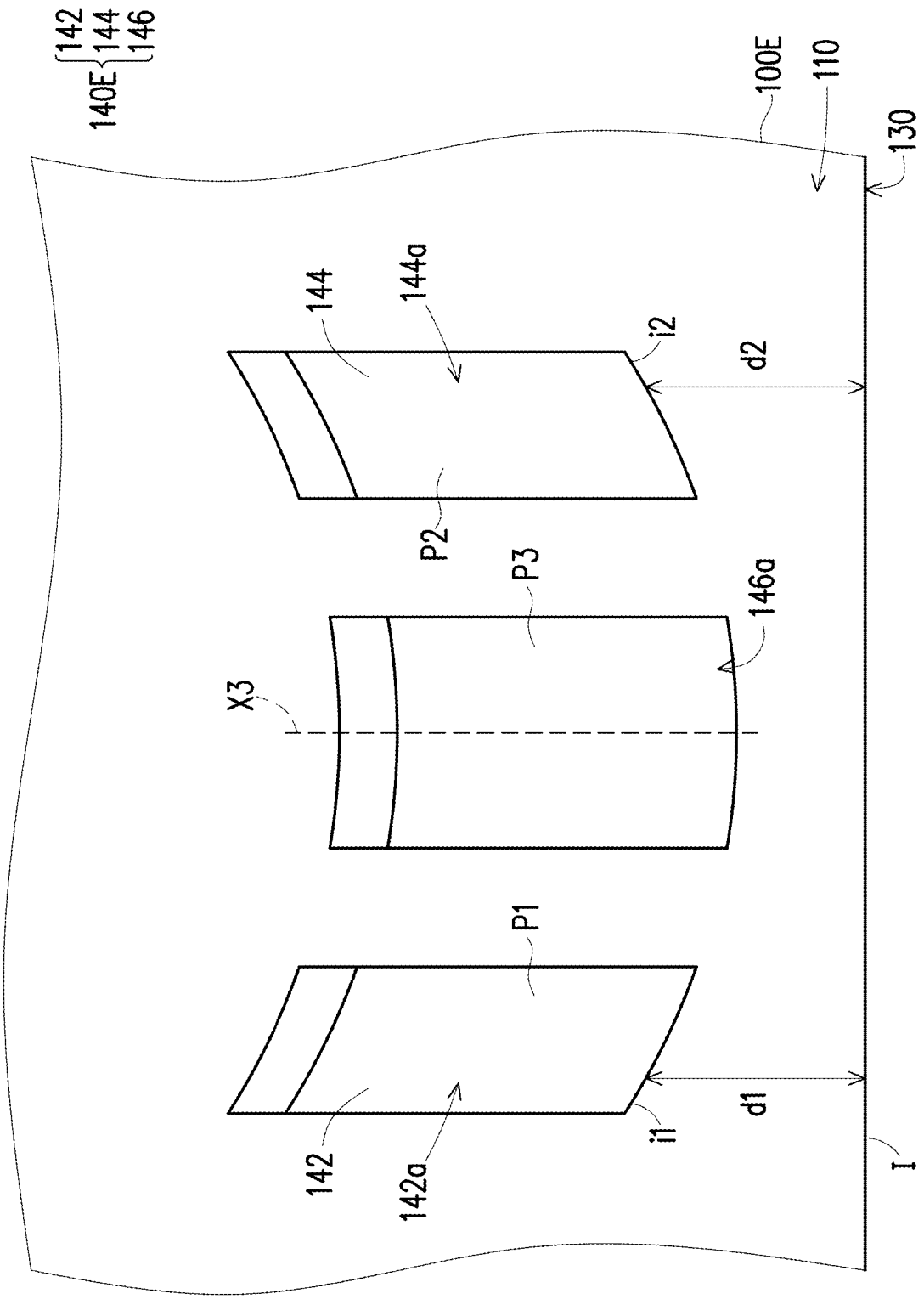
FIG. 13 is a bottom enlarged schematic view of a microstructure group of a light guide element according to a sixth embodiment of the disclosure.

FIG. 13 is a bottom enlarged schematic view of a microstructure group of a light guide element according to a sixth embodiment of the disclosure. A microstructure group 140E of a light guide element 100E of FIG. 13 is similar to the microstructure group 140C of the light guide element 100C of FIG. 10, and the differences therebetween are described as follows.

With reference to FIG. 13, in this embodiment, each of the microstructure groups 140E further includes a third microstructure 146. The third microstructure 146 is arranged between the first microstructure 142 and the second microstructure 144 and is separated from the first microstructure 142 and the second microstructure 144. The third microstructure 146 has a third light-receiving surface 146a, and an orthographic projection of the third light-receiving surface 146a on the first surface 110 is a symmetrical pattern P3. The symmetrical pattern P3 has a symmetrical axis X3. In this embodiment, the symmetrical axis X3 is, for example, perpendicular to the light-incident surface 130 and parallel to the first surface 110, but the disclosure is not limited thereto.

Figure 14:
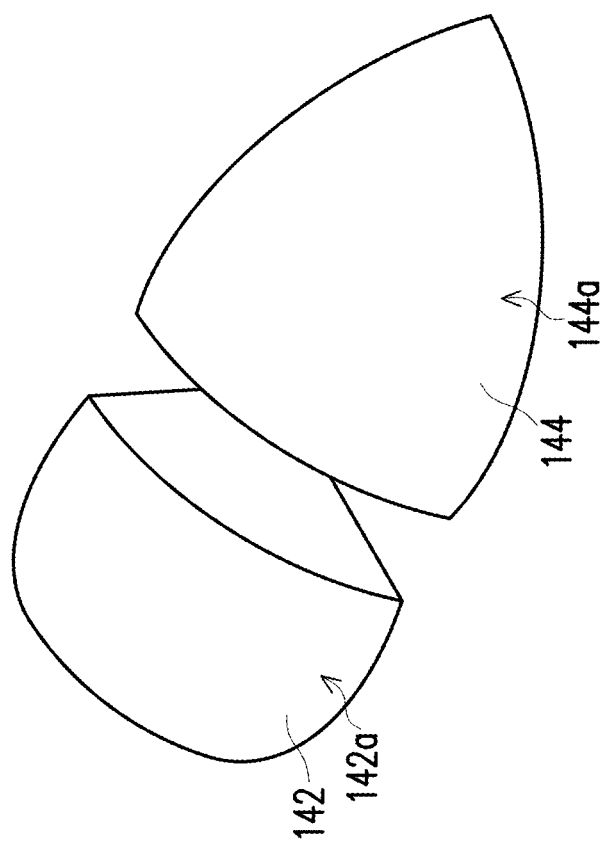
FIG. 14 is a three-dimensional schematic view of a microstructure group according to a seventh embodiment of the disclosure.
Figure 14:
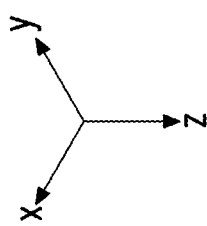
Figure 15:
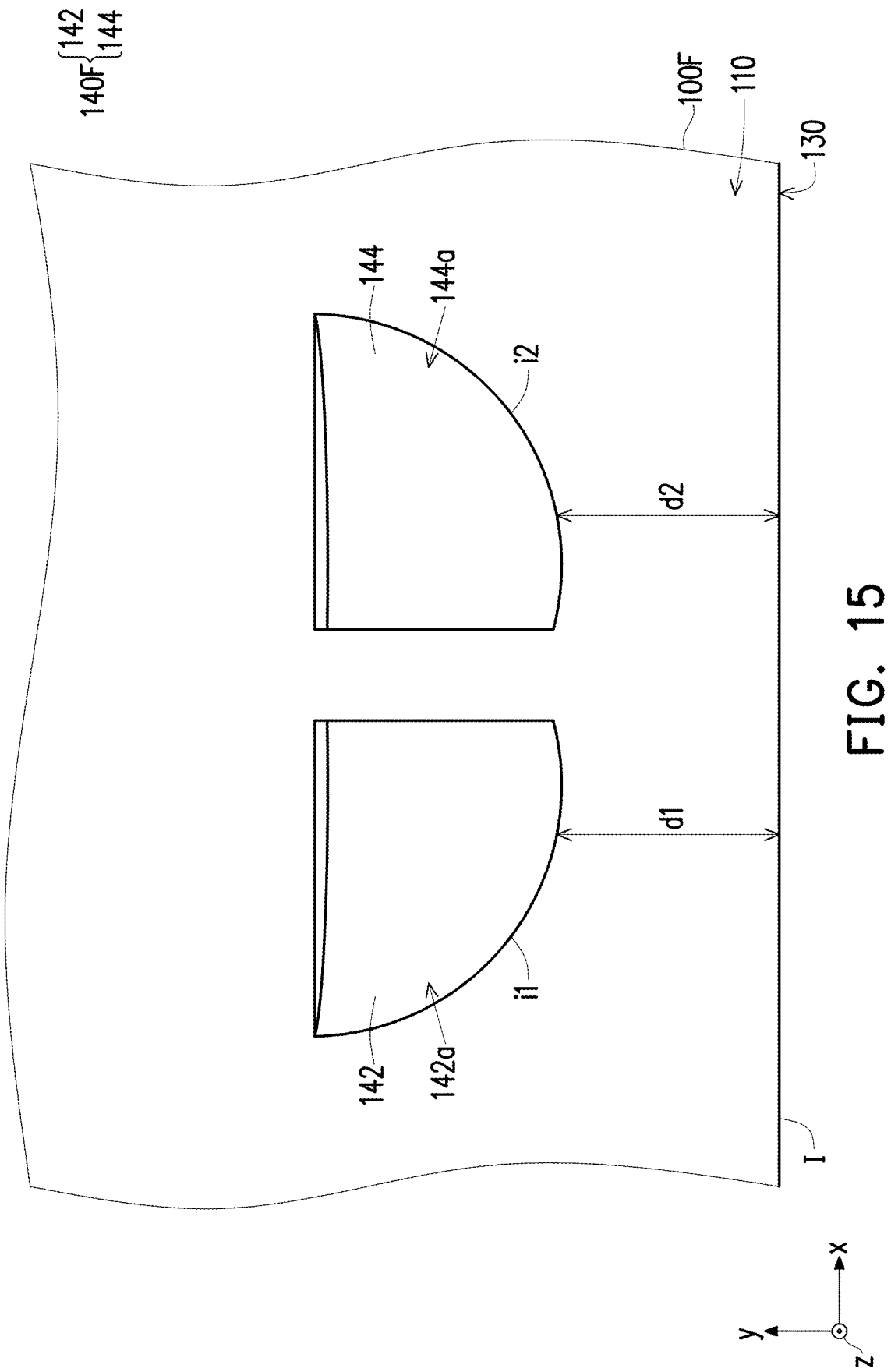
FIG. 15 is a bottom enlarged schematic view of the microstructure group of a light guide element according to the seventh embodiment of the disclosure.

FIG. 14 is a three-dimensional schematic view of a microstructure group according to a seventh embodiment of the disclosure. FIG. 15 is a bottom enlarged schematic view of the microstructure group of a light guide element according to the seventh embodiment of the disclosure. A microstructure group 140F of a light guide element 100F of FIG. 14 and FIG. 15 is similar to the microstructure group 140 of the light guide element 100 of FIG. 2 and FIG. 4, and the differences therebetween are described as follows.

With reference to FIG. 14 and FIG. 15, in this embodiment, the orthographic projection of the first microstructure 142 on the first surface 110 may be a portion of a circle (that is, a contour of the orthographic projection includes, for example, a minor arc and two straight lines, a length of one of the two straight lines is greater than a radius of curvature of the minor arc, and a length of the other one of the two straight lines is less than the radius of curvature of the minor arc), that is, an asymmetrical pattern. Further, the orthographic projection of the second microstructure 144 on the first surface 110 may be a portion of the circle, that is, an asymmetrical pattern.

Figure 16:
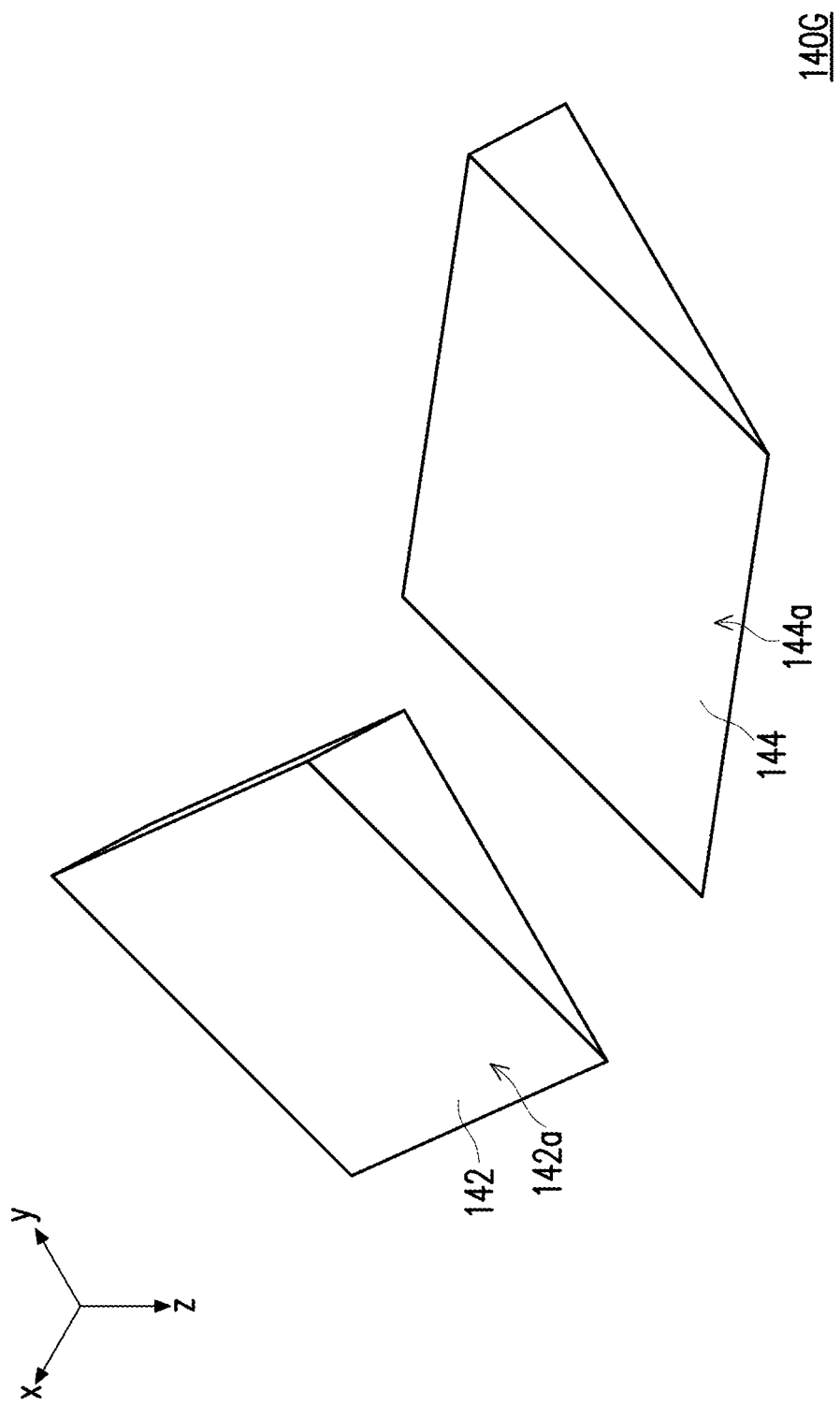
FIG. 16 is a three-dimensional schematic view of a microstructure group according to an eighth embodiment of the disclosure.
Figure 17:
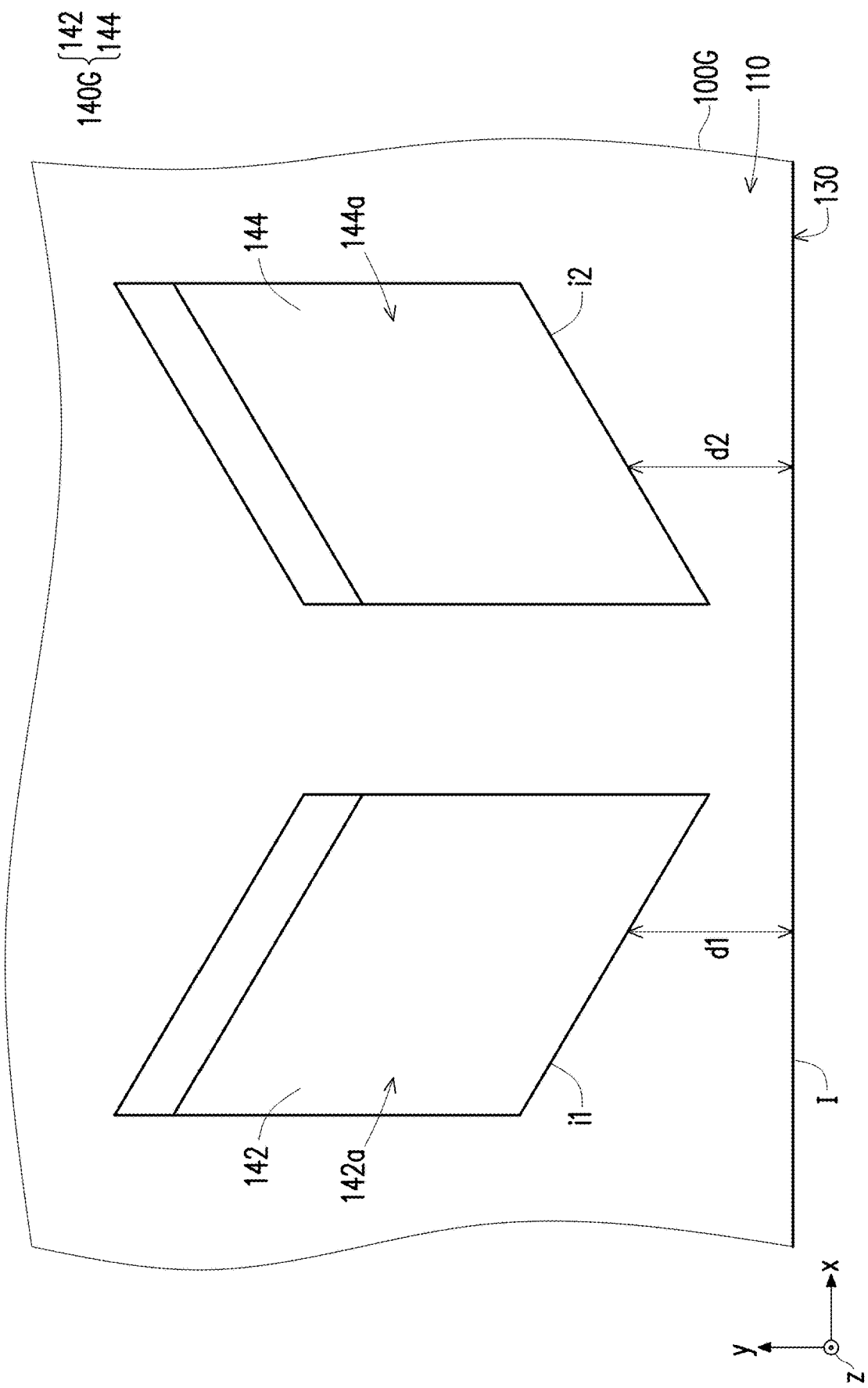
FIG. 17 is a bottom enlarged schematic view of the microstructure group of a light guide element according to the eighth embodiment of the disclosure.

FIG. 16 is a three-dimensional schematic view of a microstructure group according to an eighth embodiment of the disclosure. FIG. 17 is a bottom enlarged schematic view of the microstructure group of a light guide element according to the eighth embodiment of the disclosure. A microstructure group 140G of a light guide element 100G of FIG. 16 and FIG. 17 is similar to the microstructure group 140 of the light guide element 100 of FIG. 2 and FIG. 4, and the differences therebetween are described as follows.

With reference to FIG. 16 and FIG. 17, in this embodiment, the orthographic projection of the first microstructure 142 on the first surface 110 may be a parallelogram (asymmetrical pattern), and the orthographic projection of the second microstructure 144 on the first surface 110 may be a parallelogram (asymmetrical pattern).

It should be noted that the distribution density of the microstructure groups 140 in FIG. 2, FIG. 9, FIG. 11, FIG. 13, FIG. 14, and FIG. 16 may gradually increase as the distance from the light-incident surface 130 increases. Alternatively, the distribution density decreases gradually from the light-incident surface 130 in a direction away from the light-incident surface 130 and then gradually increases. On the other hand, the microstructures in the abovementioned different embodiments may also be distributed on the first surface 110 of the light guide element 100 in the manner of the embodiment shown in FIG. 6. The distribution density of the first microstructures 142 (second microstructures 144) may gradually increase as the distance from the light-incident surface 130 increases, or the distribution density decreases gradually from the light-incident surface 130 in the direction away from the light-incident surface 130 and then gradually increases.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide element, comprising:
   a first surface;
   a second surface opposite to the first surface;
   a light-incident surface connected to the first surface and the second surface; and
   a plurality of microstructure groups arranged on the first surface, wherein each of the microstructure groups comprises:
   a first microstructure having a first light-receiving surface facing the light-incident surface; and
   a second microstructure having a second light-receiving surface facing the light-incident surface,
   wherein the first microstructure and the second microstructure are separated from each other, and the first microstructure and the second microstructure are mirror image structures of each other,
   wherein a light-incident intersection line is provided between the first surface and the light-incident surface, a first intersection line is provided between the first light-receiving surface of the first microstructure and the first surface, a first distance is provided between the first intersection line and the light-incident intersection line in a first direction, a second intersection line is provided between the second light-receiving surface of the second microstructure and the first surface, and a second distance is provided between the second intersection line and the light-incident intersection line in the first direction, wherein a variation trend of the first distance in a second direction is opposite to a variation trend of the second distance in the second direction, the first direction is perpendicular to the light-incident surface, and the second direction is parallel to the light-incident intersection line.

2. The light guide element according to claim 1, wherein a first distribution curve of a radius of curvature of the first intersection line is opposite to a second distribution curve of a radius of curvature of the second intersection line.

3. The light guide element according to claim 2, wherein a portion of the first distribution curve and a portion of the second distribution curve are the same.

4. The light guide element according to claim 1, wherein an orthographic projection of the first light-receiving surface on the first surface is a first pattern, and the first pattern is an asymmetrical pattern.

5. The light guide element according to claim 4, wherein each of the microstructure groups further comprises a third microstructure, the third microstructure is arranged between the first microstructure and the second microstructure, the third microstructure has a third light-receiving surface, and an orthographic projection of the third light-receiving surface on the first surface is a symmetrical pattern.

6. The light guide element according to claim 1, wherein the microstructure groups are distributed on the first surface, the first microstructure is adjacent to the second microstructure in each of the microstructure groups, in each of the microstructure groups, the first intersection line of the first microstructure has a first end point close to the second microstructure and the second intersection line of the second microstructure has a second end point close to the first microstructure, a distance between the first end point and the light-incident intersection line is equal to a distance between the second end point and the light-incident intersection line, a gap is provided between the first end point and the second end point in the second direction, and the gap of each of the microstructure groups increases or remains unchanged as the distance between the first end point and the light-incident intersection line decreases.

7. The light guide element according to claim 6, wherein the first surface has a first arrangement region and a second arrangement region, the first arrangement region is located between the light-incident surface and the second arrangement region, the microstructure groups are arranged on the first arrangement region and the second arrangement region, the first intersection line between the first light-receiving surface of the first microstructure of each of the microstructure groups and the first surface has a first outer end point away from the second microstructure, the second intersection line between the second light-receiving surface of the second microstructure of each of the microstructure groups and the first surface has a second outer end point away from the first microstructure, a first connecting line connects the first end point and the first outer end point, and a second connecting line connects the second end point and the second outer end point, wherein an included angle between the first connecting line and the second connecting line of each of the microstructure groups arranged in the first arrangement region is less than an included angle between the first connecting line and the second connecting line of each of the microstructure groups arranged in the second arrangement region.

8. The light guide element according to claim 7, wherein the gap of each of the microstructure groups arranged in the first arrangement region decreases as the distance between the first end point and the light-incident intersection line increases, and the gap of each of the microstructure groups arranged in the second arrangement region remains unchanged as the distance between the first end point and the light-incident intersection line increases.

9. The light guide element according to claim 7, wherein the first surface further comprises a third arrangement region, the second arrangement region is located between the first arrangement region and the third arrangement region, the light guide element further comprises a plurality of auxiliary microstructures, and the auxiliary microstructures are arranged in the third arrangement region, wherein an orthographic projection of each of the auxiliary microstructures on the first surface is different from an orthographic projection of each of the first microstructures on the first surface.

10. The light guide element according to claim 6, wherein a distribution density of the microstructure groups on the first surface gradually increases from the light-incident surface in a direction away from the light-incident surface.

11. The light guide element according to claim 1, wherein the first microstructures are distributed on the first surface, the second microstructures are distributed on the first surface, the first microstructures form a first distribution pattern, the second microstructures form a second distribution pattern, and the first distribution pattern and the second distribution pattern are different and are not mirror image patterns.

12. The light guide element according to claim 11, wherein a distribution density of the first microstructures on the first surface gradually increases from the light-incident surface in a direction away from the light-incident surface, and a distribution density of the second microstructures on the first surface gradually increases from the light-incident surface in the direction away from the light-incident surface.

13. A backlight module, comprising:
a light guide element, comprising:
  a first surface;
  a second surface opposite to the first surface;
  a light-incident surface connected to the first surface and the second surface; and
  a plurality of microstructure groups arranged on the first surface, wherein each of the microstructure groups comprises:
    a first microstructure having a first light-receiving surface facing the light-incident surface; and
    a second microstructure having a second light-receiving surface facing the light-incident surface, wherein the first microstructure and the second microstructure are separated from each other, and the first microstructure and the second microstructure are mirror image structures of each other,
  wherein a light-incident intersection line is provided between the first surface and the light-incident surface, a first intersection line is provided between the first light-receiving surface of the first microstructure and the first surface, a first distance is provided between the first intersection line and the light-incident intersection line in a first direction, a second intersection line is provided between the second light-receiving surface of the second microstructure and the first surface, and a second distance is provided between the second intersection line and the light-incident intersection line in the first direction, wherein a variation value distribution curve of the first distance in a second direction is opposite to a variation value distribution curve of the second distance in the second direction, the first direction is perpendicular to the light-incident surface, and the second direction is parallel to the light-incident intersection line; and a light-emitting element located beside the light-incident surface.

14. The backlight module according to claim 13, further comprising:

at least one optical film located on one side of the second surface.

* * * * *